United States Patent
Tominaga et al.

[11] Patent Number: 6,111,649
[45] Date of Patent: Aug. 29, 2000

[54] THICKNESS MEASURING APPARATUS USING LIGHT FROM SLIT

[75] Inventors: Tamotsu Tominaga, Akishima; Masaru Nogami; Satoshi Hirokawa, both of Kodaira, all of Japan

[73] Assignee: Hitachi Denshi Kabushiki Kaisha, Tokyo, Japan

[21] Appl. No.: 09/415,264

[22] Filed: Oct. 12, 1999

[30] Foreign Application Priority Data

Oct. 12, 1998 [JP] Japan .................................. 10-289008

[51] Int. Cl.[7] .................................................. G01B 11/06
[52] U.S. Cl. .......................... 356/381; 356/372; 356/387
[58] Field of Search .................................... 356/381, 372, 356/387

[56] References Cited

U.S. PATENT DOCUMENTS

| | | | |
|---|---|---|---|
| 5,923,429 | 7/1999 | Takeuchi et al. | 356/382 |
| 5,959,737 | 9/1999 | Kaminaga et al. | 356/430 |

*Primary Examiner*—Frank G. Font
*Assistant Examiner*—Reginald A. Ratliff

*Attorney, Agent, or Firm*—Antonelli, Terry, Stout & Kraus, LLP

[57] ABSTRACT

The apparatus for measuring the thickness of an object being measured has a first position measuring unit for measuring the position of a first surface of the object, a second position measuring unit for measuring the position of a second surface of said object opposite to said first surface, and a thickness obtaining portion for obtaining the thickness of the object on the basis of the position of the first surface determined by said first position measuring unit and the position of the second surface determined by the second position measuring unit. The thickness obtaining portion includes a light source for irradiating slit light on the second surface of the object by obliquely projecting light through a slit, an image pick-up portion having an image pick-up surface opposed to the progressing direction of the reflected slit light from the second surface of the object in order to pick up the reflected slit light to produce the video signal of the slit light, an analog/digital converter for converting the video signal from the image pick-up portion into a digital signal to produce digital image data of the reflected slit light, and a position obtaining section for obtaining the position of the second surface of the object on the basis of the image data of the reflected slit light from the analog/digital converter.

15 Claims, 8 Drawing Sheets

FIG.10

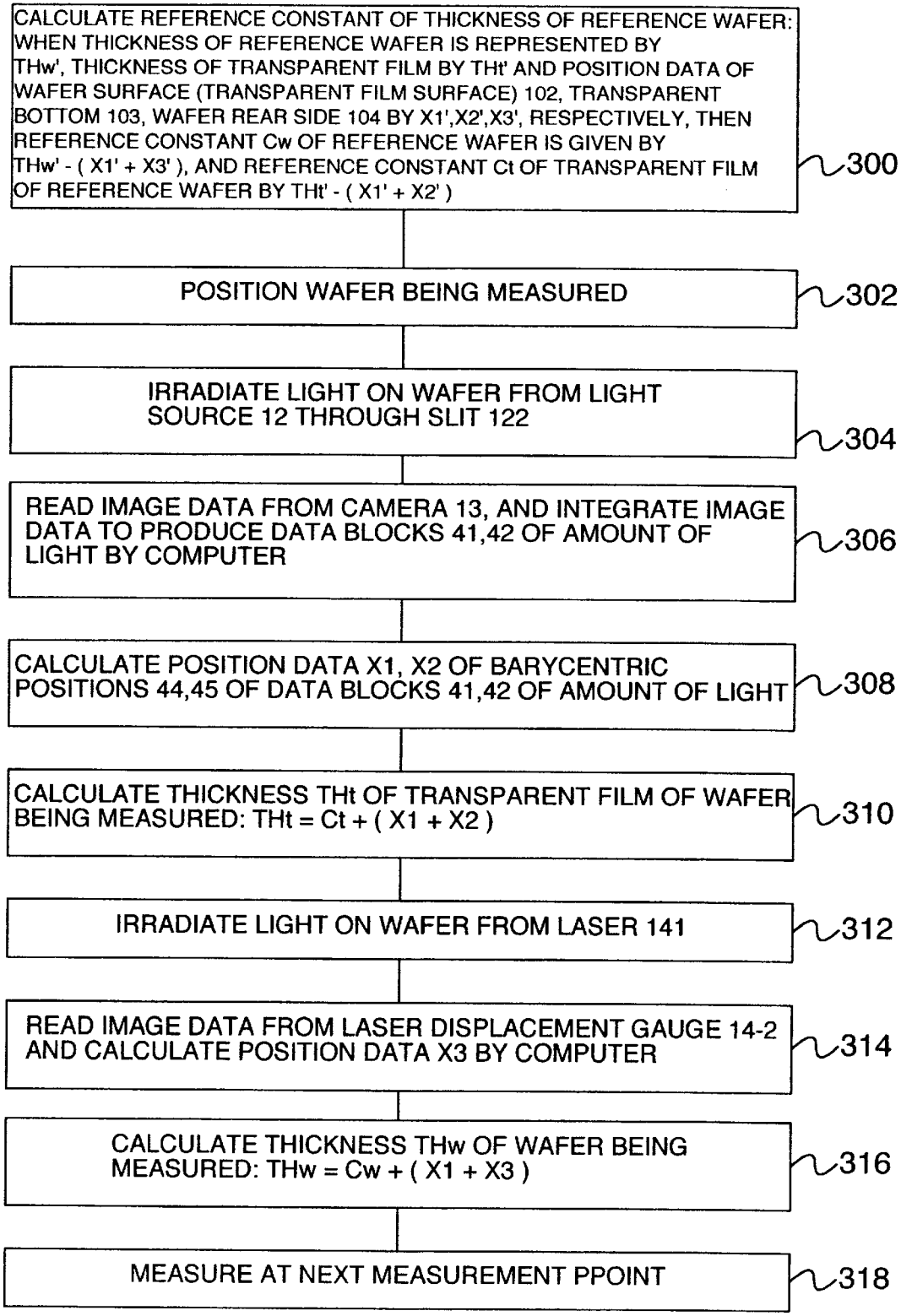

- CALCULATE REFERENCE CONSTANT OF THICKNESS OF REFERENCE WAFER: WHEN THICKNESS OF REFERENCE WAFER IS REPRESENTED BY $TH_w'$, THICKNESS OF TRANSPARENT FILM BY $TH_t'$ AND POSITION DATA OF WAFER SURFACE (TRANSPARENT FILM SURFACE) 102, TRANSPARENT BOTTOM 103, WAFER REAR SIDE 104 BY $X1', X2', X3'$, RESPECTIVELY, THEN REFERENCE CONSTANT $C_w$ OF REFERENCE WAFER IS GIVEN BY $TH_w' - (X1' + X3')$, AND REFERENCE CONSTANT $C_t$ OF TRANSPARENT FILM OF REFERENCE WAFER BY $TH_t' - (X1' + X2')$ — 300
- POSITION WAFER BEING MEASURED — 302
- IRRADIATE LIGHT ON WAFER FROM LIGHT SOURCE 12 THROUGH SLIT 122 — 304
- READ IMAGE DATA FROM CAMERA 13, AND INTEGRATE IMAGE DATA TO PRODUCE DATA BLOCKS 41, 42 OF AMOUNT OF LIGHT BY COMPUTER — 306
- CALCULATE POSITION DATA $X1, X2$ OF BARYCENTRIC POSITIONS 44, 45 OF DATA BLOCKS 41, 42 OF AMOUNT OF LIGHT — 308
- CALCULATE THICKNESS $TH_t$ OF TRANSPARENT FILM OF WAFER BEING MEASURED: $TH_t = C_t + (X1 + X2)$ — 310
- IRRADIATE LIGHT ON WAFER FROM LASER 141 — 312
- READ IMAGE DATA FROM LASER DISPLACEMENT GAUGE 14-2 AND CALCULATE POSITION DATA $X3$ BY COMPUTER — 314
- CALCULATE THICKNESS $TH_w$ OF WAFER BEING MEASURED: $TH_w = C_w + (X1 + X3)$ — 316
- MEASURE AT NEXT MEASUREMENT PPOINT — 318

THICKNESS MEASURING APPARATUS USING LIGHT FROM SLIT

BACKGROUND OF THE INVENTION

The present invention relates to thickness measuring apparatus, and particularly to a thickness measuring apparatus for measuring the thickness of an object having a transparent or light-transmittable portion such as a semiconductor wafer.

For example, for the measurement of the thickness of a semiconductor wafer as an object having a transparent or light-transmittable layer, it is necessary that the measuring apparatus be able to determine a thickness of about 800~100 $\mu$m with a precision of about 1 $\mu$m before and after grinding the rear side of the semiconductor wafer.

One of the conventional methods of measuring the thickness of such a semiconductor wafer employs two electric micrometers. In this method, the two probes or two measuring contact ends of the two electric micrometers are pressed against the front and rear sides of the wafer, respectively so that the micrometers can determine the positions of the front and rear sides and then find the wafer thickness from the measured front and rear side positions.

In this method, however, since the probes or the contact ends of the electric micrometers are pressed at a constant pressure against the wafer sides, particularly the front side where electric circuits are printed is damaged (injured) by the contact end. Thus the measured object must be discarded.

Another method for determining the thickness of, for example, a semiconductor wafer as an object having a transparent layer utilizes a triangulation type laser displacement gauge. In this method, as exemplarily illustrated in FIG. 1, two laser displacement gauges 14-1, 14-2 of the triangulation type are disposed above and below a semiconductor wafer 10, respectively. The semiconductor wafer 10 is positioned, and measured about its front and rear side positions by the laser displacement gauges. Then, the thickness of the wafer is calculated from those measurements. This triangulation type laser displacement gauge has a PSD (position sensitive device, this abbreviated name will hereinafter be used) as a displacement sensor. This PSD, as illustrated in FIG. 2, is constructed by a high-resistance silicon semiconductor with a resistance layer (for example, P layer) formed as a PN junction on the surface to have a photoelectric effect. When light is incident to the PSD, the light is converted into a photocurrent. The photocurrent flows between the ends of the resistance layer and is taken out from the electrodes. Since the resistance layer has a uniform resistance over the entire surface, the photocurrent is dividedly taken out from the electrodes in inverse proportion to the distance from the light incident position to each electrode. Thus a photocurrent according to the amount of light and the incidence position is detected, and barycentric position of incident light is detected. Such a triangulation type laser displacement gauge is known as UltraGage 9510™ etc. manufactured by ADE corporation.

A description will be made of the measurement of, for example, the thickness of the wafer 10 having a transparent film 101 shown in FIG. 1 as an object being measured. A laser light beam I emitted from a laser light oscillator 141-1 of the laser displacement gauge 14-1 located above the wafer 10 is passed through a lens and irradiated on the surface of the wafer 10. A laser beam R1 reflected from the surface of the transparent film 101 and a laser beam R2 reflected from the bottom side 103 of the transparent film 101 are converged at two points 145, 146 on a PSD 143-1, respectively.

The PSD 143-1 does not detect separately the positions of the two points 145, 146, but detects one barycentric position of light depending on the amounts of light at the two points and the positions of the points as the surface position of the wafer 10. Therefore, this measuring apparatus cannot correctly detect the surface position (the position of the surface 102 of the transparent film 101) of the wafer 10. In that case, if the wafer 10 has a transparent film of, for example, about 10 $\mu$m thickness, there occurs a serious problem that the thickness of the wafer 10 will be measured with error of about several microns. In FIG. 1, reference numeral 14-2 represents a triangulation type laser displacement gauge for measuring the position of the rear side of the wafer 10, and 143-1 and 143-2 represent the laser beam oscillator and PSD of the gauge.

Another method of measuring the thickness of semiconductor wafer 10 shown in FIG. 1 as a measured object having a transparent layer employs an electrostatic capacitance type displacement sensor in place of the triangulation type laser displacement gauge. In this method, the two electrodes are pressed against the front and rear sides of the wafer 10, respectively to measure the electrostatic capacitance of the wafer, thereby determining the thickness. In this method, however, since the transparent film 101 and the underlying non-transparent layer (reflecting layer) 105 are both insulating layers, the thickness of each layer cannot be measured correctly even though the dielectric constants of these layers 101, 105 are known. Thus, the thickness of wafer 10 including the thickness of the transparent film cannot be measured correctly.

SUMMARY OF THE INVENTION

As described above, the conventional methods have the defects that when measurement is made the object being measured is damaged, and that when the object being measured has a transparent or light-transmittable film the thickness of the object cannot be measured correctly.

It is an object of the invention to provide a thickness measuring apparatus capable of removing these defects of the prior art, correctly measuring the thickness of the object even having a transparent or light-transmittable film on the surface, and measuring the thickness without damaging the object being measured.

In order to achieve the above object, the present invention proposes a measuring apparatus that is able to recognize the reflected light from the surface of the transparent or light-transmittable film, even if it is present, and to determine the position of the surface of the transparent film, thereby correctly measuring the thickness of the wafer.

That is, according to one aspect of the invention, there is provided a measuring apparatus having a first position measuring portion for measuring the position of a first surface (or the surface with no transparent film or light-transmittable layer, namely, the non-transparent film or non-light transmittable layer side) of an object being measured, a slit light source for projecting slit light on a second surface (namely, the transparent film side) of the object, an image pick-up portion for picking up the projected slit light in the reflecting direction, and a second position measuring portion for measuring the position of the second surface by integrating the picked up video signal in the longitudinal direction of the slit light and calculating the barycentric position (the center position) of the integrated image data along the slit-light-width direction (that is, the direction perpendicular to the longitudinal direction of the slight light), whereby the thickness of the object being measured is estimated from the first surface position the first position measuring portion has determined and the second surface position the second position measuring portion has determined. The above-given image pick-up portion may be a television camera or line sensor camera. Use of the line sensor will make the integrating means unnecessary.

When the object being measured has a transparent film, very thin slit light of, for example, about 1 μm in width is projected in a slant direction (an incident angle of, for example, 30°) in order for the reflected light from this transparent film surface to be recognized. The slit-like light (slit light) projected on the surface of the object being measured, if a transparent film is present, is reflected from the transparent film surface and also enters into the transparent film, being reflected from the bottom of the transparent film. A television camera picks up the reflected light (slit-like reflected light) from the reflecting direction (a reflection angle of, for example, 30°). In this case, the slit light reflected from the surface of the object (or the transparent film surface) and the slit light reflected from the bottom of the transparent film can be caught as two separated slit images because the slit width is much smaller than the thickness of the transparent film, for example, a few microns~10 μm. The reflected slit image on the surface side of the transparent film can be discriminated by image processing, and the position of the front side can be determined. When the object being measured has no layer on the rear side that causes double reflection as in the transparent film or no layer into which light enters, that is, when it is flat, the triangulation type laser displacement gauge that can precisely measure the position of the reflected light from a single surface is used to measure the position of the rear side.

In addition, the present invention is capable of measuring only the thickness of the transparent layer. In other words, according to the invention, there is provided a measuring apparatus having a slit light source for projecting slit light in a slant direction relative to an object having a transparent layer on the front side, a television camera for picking up the reflected slit light rays reflected from the light-transmittable layer side and the bottom of the light-transmittable layer, and position determining means for integrating the video signals picked up by the television camera in the longitudinal direction of the two reflected slit light rays, and calculating the barycentric position of the integrated image data along the width direction of the slit light, thereby determining the position of the light-transmittable layer surface of the object and the position of the bottom reflecting layer (or the rear side of the transparent layer). The thickness of the transparent layer can be estimated from the position of the transparent layer surface and the position of the bottom reflecting layer.

BRIEF DESCRIPTION OF THE DRAWINGS

FIG. 10 is a flowchart to which reference is made in explaining another example of the operation of the embodiment of the thickness measuring apparatus for measuring the thickness of an object being measured.

DESCRIPTION OF THE EMBODIMENTS

An embodiment of a thickness measuring apparatus according to the invention will be described with reference to the accompanying drawings.

Figure 1:
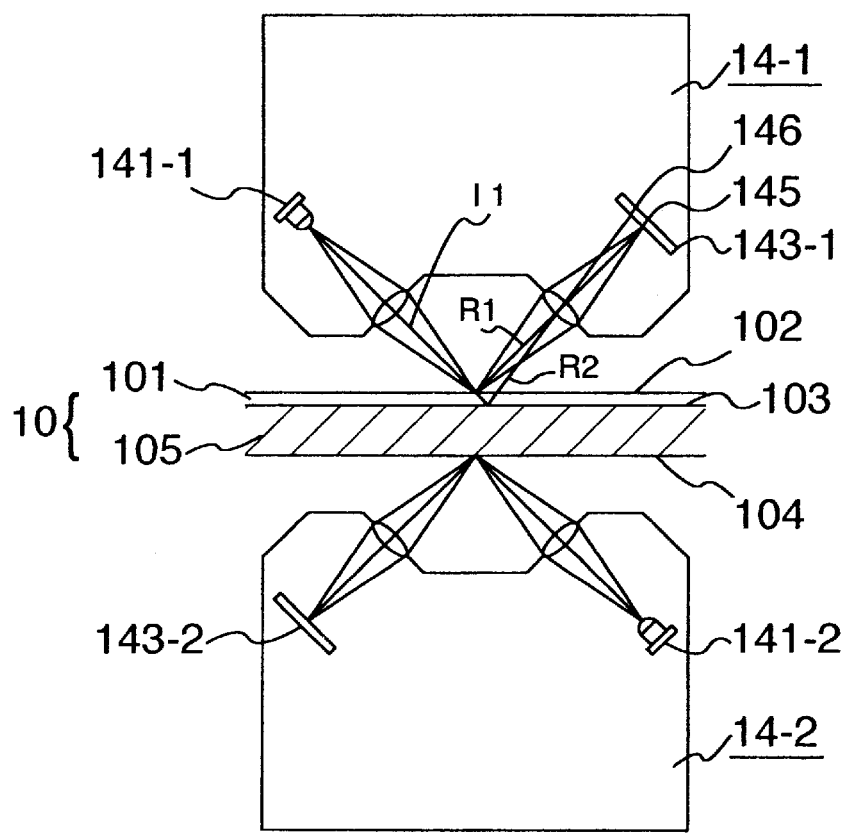
FIG. 1 is a diagram showing the construction of an example of a conventional thickness measuring apparatus using the triangulation type laser displacement gauge.
Figure 2:
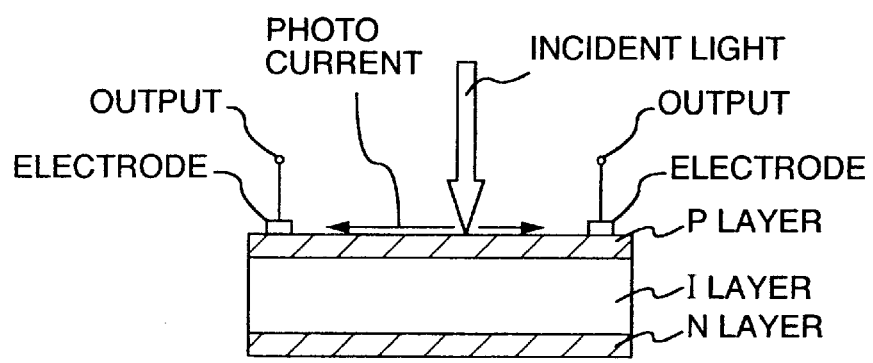
FIG. 2 is a lateral cross-sectional view of one example of the PSD.
Figure 3:
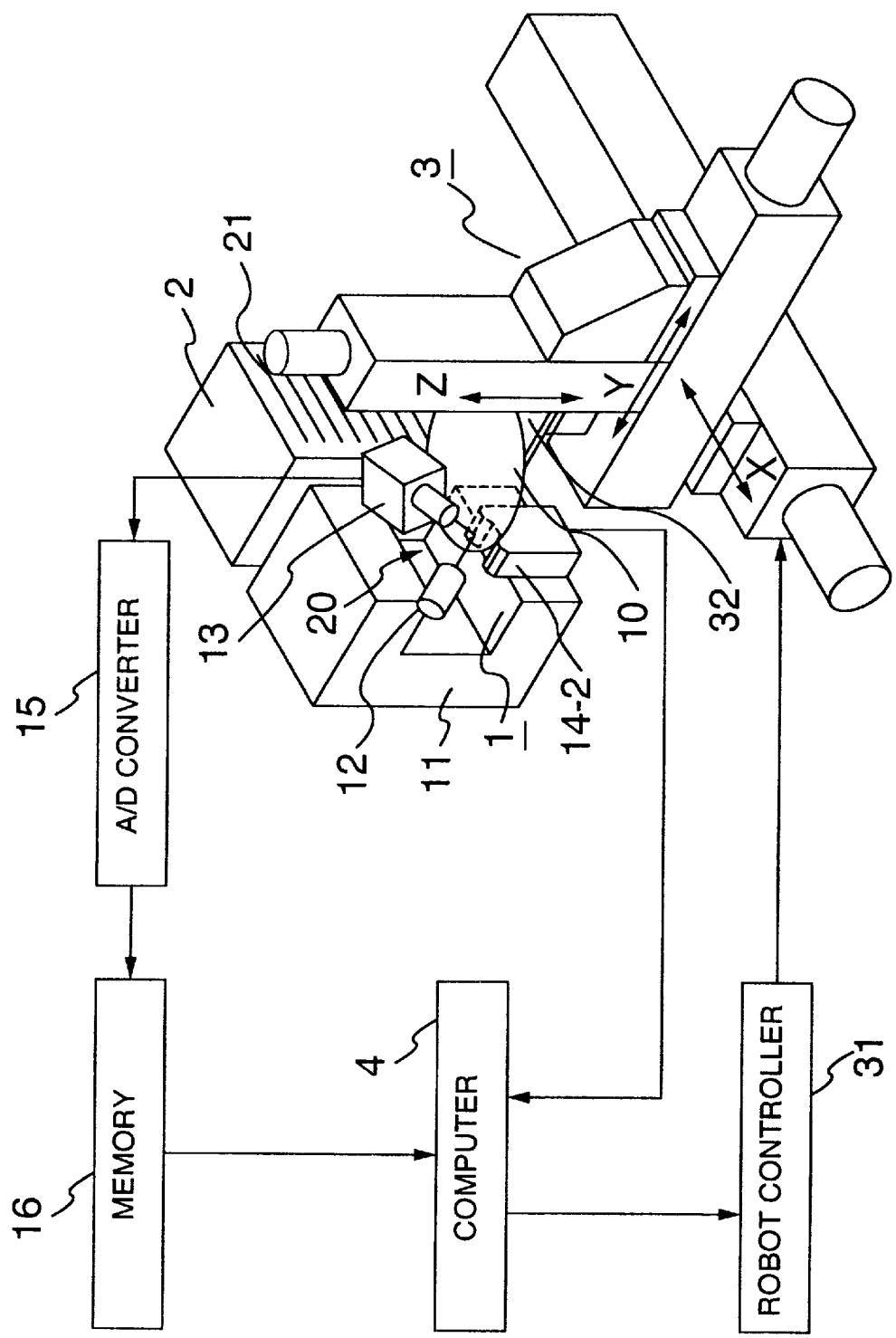
FIG. 3 is an external perspective view showing the whole structure of an embodiment of a thickness measuring apparatus according to the invention.
Figure 4:
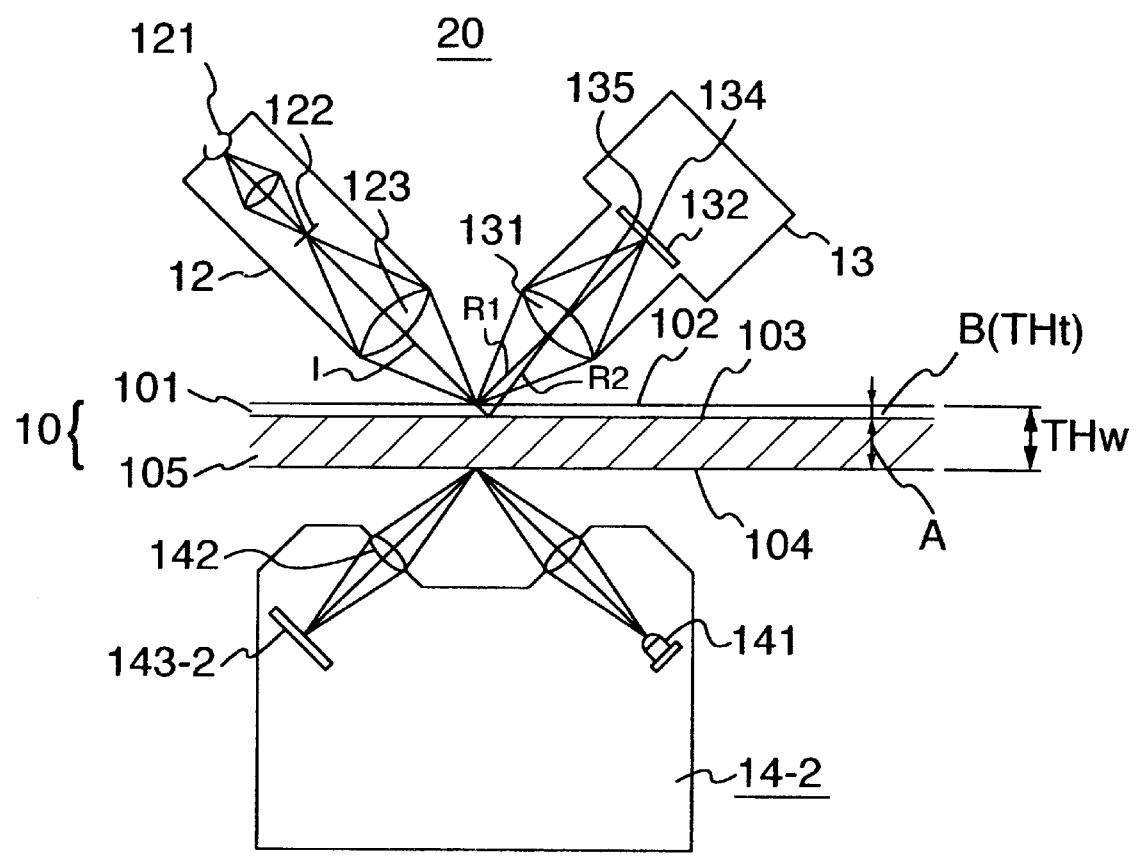
FIG. 4 is a cross-sectional view showing the construction of the position measuring portion of the thickness measuring apparatus illustrated in FIG. 3.
Figure 5:
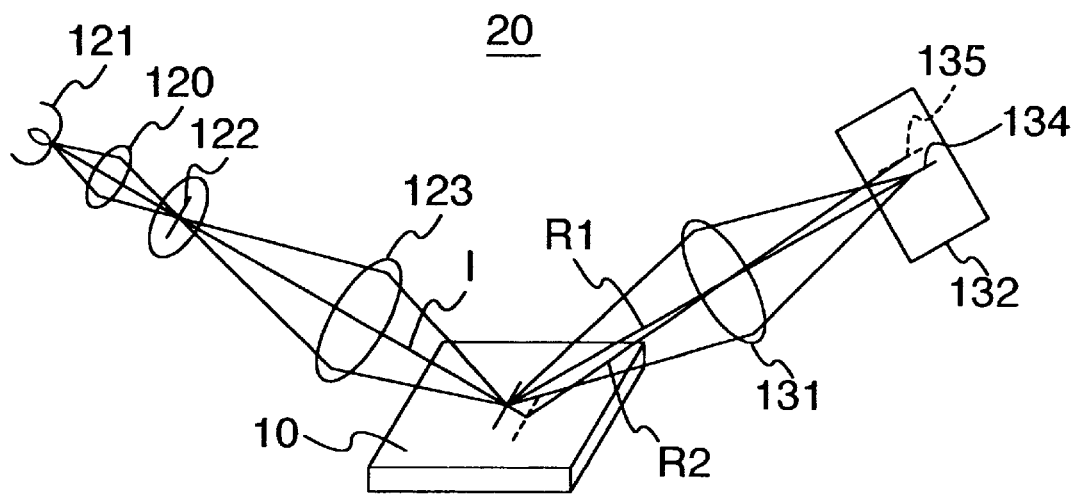
FIG. 5 is a perspective view showing the construction of the position measuring portion using the slit light in the thickness measuring apparatus of FIG. 3.
Figure 6:
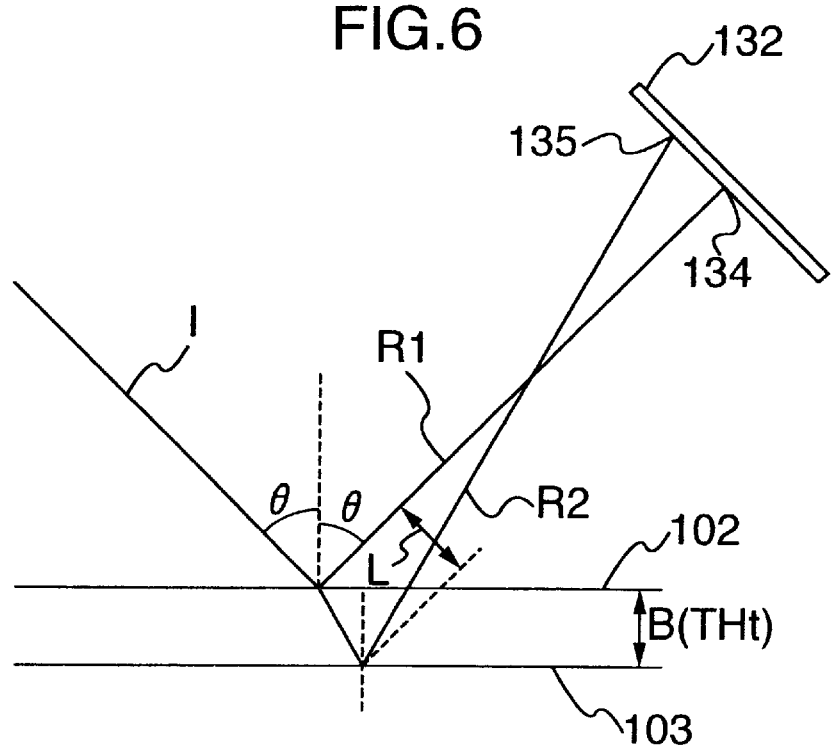
FIG. 6 is a schematic diagram showing the measurement principle of the position measuring portion using the slit light in FIG. 5.

FIG. 3 is an external perspective view showing the whole construction of an embodiment of a thickness measuring apparatus according to the invention. FIG. 4 is a cross-sectional view of the construction of the position measuring portion of the thickness measuring apparatus of FIG. 3. FIG. 5 is a perspective view showing the construction of the position measuring portion using the slit light in the thickness measuring apparatus of FIG. 3. FIG. 6 is a schematic diagram showing the measurement principle of the position measuring portion using the slit light in FIG. 5. In this embodiment, the object being measured is, for example, a semiconductor wafer that has a transparent layer (or a light-transmittable layer) on the surface and that is measured in its thickness. However, the object to be measured in this invention is not limited to the above wafer, but may be anything with or without a transparent layer (or a light-transmittable layer) provided on the surface.

The thickness measuring apparatus of this embodiment includes, as shown in FIG. 3, a measuring unit 1, a housing, for example, a cassette unit 2 for storing a plurality of objects being measured, a robot 3 serving as a positioner or a positioning section for taking an object out of the cassette unit, and carrying and positioning it on a measuring place, a computer 4 and so on. The measuring unit 1 is constructed by a substantially C-shaped frame 11 and elements mounted thereon that are a slit light source 12, an image pick-up section, for example, a television camera 13, a laser displacement gauge 14-2, and a position measuring portion 20 using slit light. The television camera 13 for measuring the wafer surface side is connected to an analog-to-digital (A/D) converter 15. The output of the A/D converter 15 is connected through a memory 16 to the computer 4. The cassette unit 2 has a cassette 21 placed therein. A plurality of wafers 10 being measured are stored within the cassette 21.

The robot 3 is connected to a robot controller 31 and controlled by the robot controller 31 so that an arm 32 carries one of the wafers 10 to the measuring place and positions it. The wafer is normally formed of the transparent film 101 and a non-transparent layer (or a reflecting layer)

105 provided under the film. The rear surface (the surface of the non-transparent layer 105 opposite to the transparent layer 101) 104 of the wafer 10 has a smooth surface finished by grinding and does not have a transparent film. Therefore, the position of the rear side 104 is measured by the conventional triangulation type laser displacement gauge 14-2 that can measure the position of the reflected light from the single smooth surface with high precision.

On the other hand, as shown in FIG. 4, since there is the transparent layer 101 on the major surface side of the wafer, the positions of the major surface side (the position of the surface 102 of the transparent layer 101 and the position of the surface 103 of the non-transparent layer 105 on the transparent layer 101 side) of the wafer are measured by use of the position measuring portion 20 using slit light according to the invention.

The position measuring portion 20 is formed of the slit light source 12 and an image pick-up portion, for example, the television camera 13 as for example described below. In the slit light source 12, light from a light source 121 is passed through a lens 120 and irradiated on a slit 122. The incident light I showing a slit image from the slit 122 is passed through a lens 123 and slantingly projected on the surface 102 of the wafer. Here, the incident angle θ (see FIG. 6) of the incident light (that is, slit-like light ray) I may be arbitrary though it should be preferably 30 degrees at which the position can be easily measured. The width of the slit 122 is much smaller than the thickness of the transparent film, for example, than a value of a few microns~10 $\mu$m, or the width is smaller than, for example, 1 $\mu$m.

In the television camera 13, the reflected light (slit-like reflection light ray) R1 from the surface 102 of the transparent layer 101 of the wafer 10 and the reflected light (slit-like reflection light ray) R2 from the bottom surface 103 are passed through a focusing lens 131 and focussed on an image pick-up device, for example, a CCD 132 as a solid-state image pick-up device, so that two slit images (slit-like images) 134, 135 are formed on the CCD. In other words, the image pick-up device of the television camera is disposed so that for example, its picking-up surface is opposed to the progressing direction of the reflected slit light from the surface 102 of the light-transmittable layer 101 and the reflected slit light from the surface 103 of the non-light-transmittable layer 105 under the light-transmittable layer (for example, the picking-up surface is substantially perpendicular to the progressing direction of those reflected slit light rays, but it is not necessarily perpendicular thereto). Thus the image pick-up device picks up the reflected slit light rays.

Here, the light source 121 may be a light source that emits light of any wavelength. In that case, the transparent layer (light-transmittable layer) is made of a material through which the light from the light source 121 can be transmitted, and the non-transparent layer (non-transmittable layer) is made of a layer which does not allow the light from the light source 121 to transmit therein, or which can cut off the light.

In addition, it is assumed that the position at which the light from light source 121 is focused on the surface 102 and the position at which the laser light from a light source 141 is focused on the surface 104 lie in substantially the same horizontal coordinate plane in FIG. 4.

Further, it is assumed that the emitting direction of the light ray from the light source 121 substantially coincides with the emitting direction of the light ray from the light source 141.

According to an aspect of the present invention, the thickness measuring apparatus according to the present invention is arranged to include:

a light source 121 for emitting obliquely a slit-like light ray from the slit on a major surface of a light-transmittable layer of an object (e.g., wafer) which includes the light-transmittable layer 101 and a non-light-transmittable layer 105;

an image pick-up device for receiving a first reflection slit-like light ray reflected from the major surface of the light-transmittable layer of the object and a second reflection slit-like light ray reflected from a major surface 103 of the non-light-transmittable layer 105 and outputting first and second video signals relating to the first and second reflection slit-like light rays;

an analog-to-digital converter 15 for converting the first and second video signals into first and second digital image data;

a position detecting section (4, steps 204–206, steps 306–308) for integrating the first and second digital image data along a longitudinal direction of the first and second reflection slit-like light rays, and calculating first and second barycentric positions (see FIG. 8) of the integrated first and second digital image data in a width direction of the first and second reflection slit-like light rays, respectively, the calculated first and second barycentric positions corresponding to positions of the major surface of the light-transmittable layer and the surface 103 of the non-light-transmittable layer of the object, respectively; and a first thickness calculating section (4, step 208, step 310) for calculating a thickness of the light-transmittable layer 101 of the object on a basis of the position X1 of the major surface 102 of the light-transmittable layer and the position X2 of the major surface 103 of the non-light-transmittable layer;

a position measuring section 14-2 for measuring a position X3 of a rear surface 104 of the non-light-transmittable layer 105 opposite to the major surface thereof; and a second thickness calculating section (4, step 214, step 316) for calculating a thickness of the object on a basis of the position X1 of the major surface 102 of the light-transmittable layer and the position X3 of the rear surface 104 of the non-light-transmittable layer 105.

Figure 9:
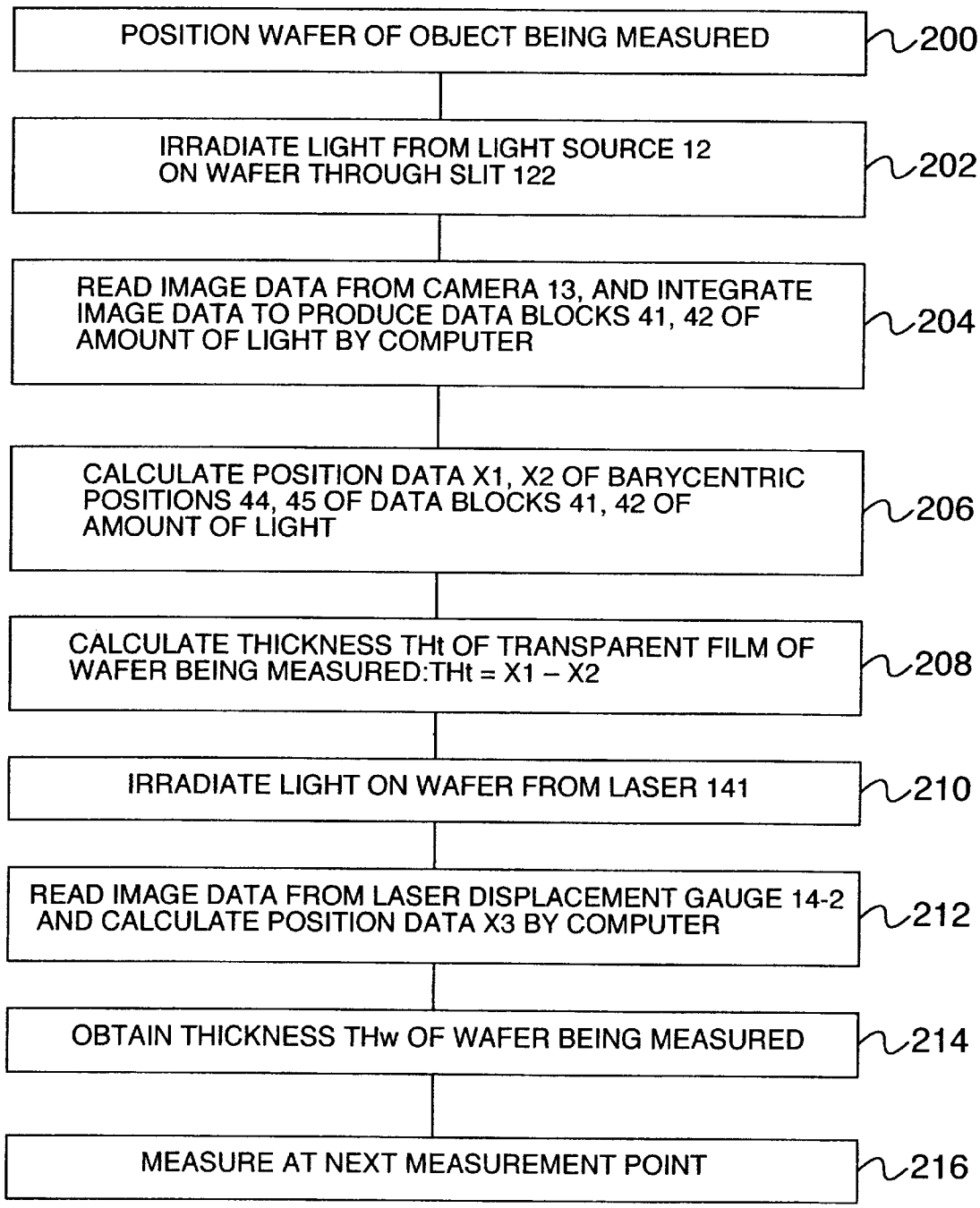
FIG. 9 is a flowchart to which reference is made in explaining an example of the operation of the embodiment of the thickness measuring apparatus for measuring the thickness of an object being measured.

The operation of this embodiment will be described with reference to the flowchart of FIG. 9. The operation shown in the flowchart of FIG. 9 is executed according to a predetermined program in the computer 4. The processing procedure shown in FIG. 9 is an example, and may be changed.

When a signal indicating start of measurement is fed into the apparatus through an input unit not shown, the computer 4 issues a positioning command to the robot controller 31 according to the program. The robot controller 31 responds to this command to control the robot 3, so that the arm 32 of the robot 3 takes the wafer 10 out of the cassette 21, and carries and positions it at a measurement position on the measuring unit 1 (step 200).

The thickness measurement is made on the wafer 10 at five positions: for example, the center, and about 10 mm inward from the left, right, upper and lower edges. The robot 3 changes the position of this wafer 10 on the measuring unit after the wafer thickness is measured at each of the five positions.

When the wafer 10 is positioned at a measurement position on the measuring unit 1, the slit light source 12 permits the light source 121 to irradiate light on the slit 122. This slit image is projected through the lens 123 on the wafer 10 at an incident angle θ (for example, 30°) (step 202). This slit light is converged on the front surface 102 and bottom surface 103 of the transparent film 101 of the wafer 10 about 10 μm thick. As illustrated in FIG. 6, the slit images on the surface 102 and bottom surface 103 of the transparent film are reflected in the direction of reflection angle θ (30°), and converged through the focusing lens 131 of the television camera 13 on the CCD 132 as two slit-like images (hereinafter, simply referred to slit images) 134, 135 shown in FIGS. 5 and 6. In this case, the CCD 132 is disposed so that its image pick-up side is substantially perpendicular to the incident light R1.

When the slit light is incident with an incident angle of 30° and reflected with an reflection angle of 30° toward the image pick-up device and the refractive index n can be neglected, the distance L (see FIG. 6) between the slit images 134 and 135 is B (10 μm) same as the thickness B (10 μm) of the transparent film 101.

When the incident angle θ is other than 30° and the refractive index n can not be neglected, the thickness B of the transparent film 101 is determined by the following expression (1) with the distance L between the slit images 134 and 135.

$$L = 2B\tan\left(\sin^{-1}\frac{\sin\theta}{n}\right)\cdot\cos\theta \tag{1}$$

where the incident angle θ is set within an range in which the slit light is not totally reflected relative to the transparent layer.

Figure 7:
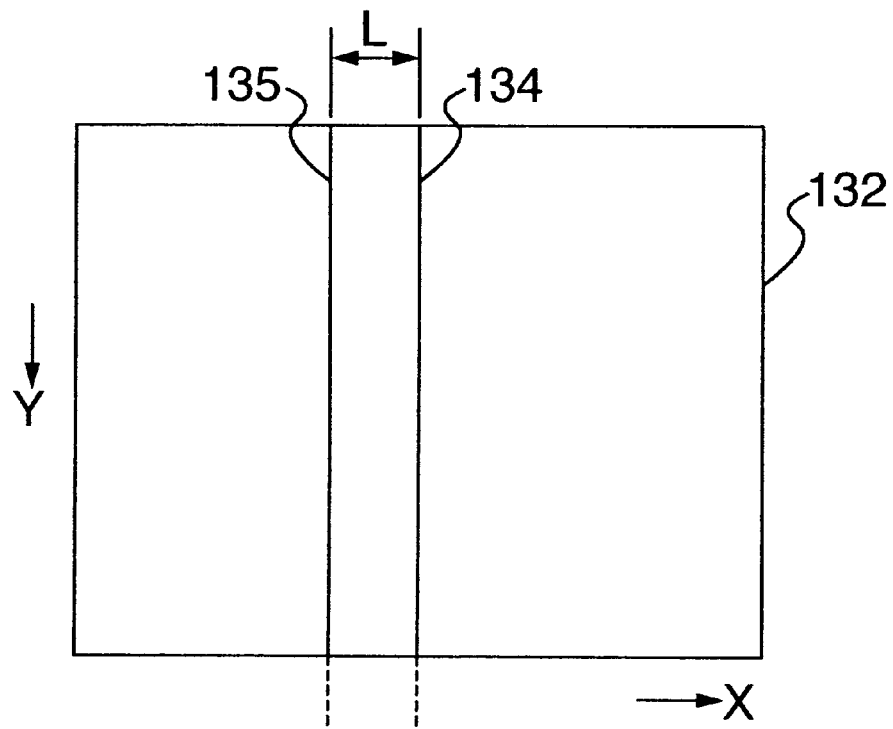
FIG. 7 is a diagram showing the images formed when the reflected slit light rays from the object being measured are focused on the image pick-up device.
Figure 8:
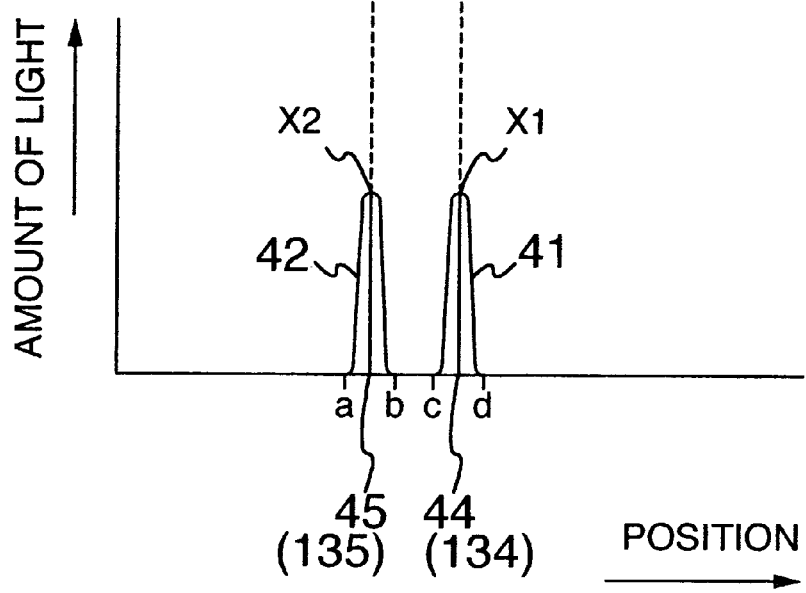
FIG. 8 is a diagram to which reference is made in explaining the processing of the video signals produced from the image pick-up device on which the slit light rays are focused as in FIG. 7.

Thus the television camera 13 picks up the two slit images 134, 135 spaced by L (10 μm) shown in FIG. 7. The video signal from the television camera 13 is supplied to the A/D converter 15. The digital signal from the converter is stored in the memory 16. The computer 4 reads the image data from the memory 16, and integrates the image data of each horizontal scanning line (in the X direction in FIG. 7) in the vertical direction (in the Y direction in FIG. 7), that is, along the longitudinal direction of the two slit images 134, 135 (step 204). FIG. 8 shows the relation between the position as abscissa, or X axis and the amount of received light as ordinate, or Y axis. The amounts of received light of slit images 134, 135 can be shown by two pulse-shaped waves 41, 42 having steep peaks, respectively.

Then, the computer 4 performs the calculations of the following expressions (2) and (3) as to the two light-amount data blocks 41, 42 with respect to the interval of the data block 41 as ab and the interval of the data block 42 as cd thereby to obtain barycentric positions X1 and X2 (that is, the center positions of the integrated light amounts of the slit images 134, 135 along the slit-light-width direction, that is, the direction perpendicular to the longitudinal direction of the slit images 134, 135), respectively.

$$\overline{x_1} = \frac{\int_a^b xf(x)dx}{\int_a^b f(x)dx} \tag{2}$$

where, f(x) and $\overline{x1}$ represent a light-amount curve and the barycentric position 44 (see FIG. 8) of the data block 41, respectively.

$$\overline{x_2} = \frac{\int_c^d xf(x)dx}{\int_c^d f(x)dx} \tag{3}$$

where, f(x) and $\overline{x2}$ represent a light-amount curve and the barycentric position 45 (see FIG. 8) of the data block 42, respectively.

In addition, since the data of the slit image 134 reflected from the transparent film surface 102 is sure to appear on the right hand in FIG. 8, the computer 4 calculates the barycentric position X1 of the right data 41 of these barycentric positions X1, X2 as the position of the transparent film surface 102 of the wafer 10, and the barycentric position X2 of the left data 42 as the position of the transparent film bottom 103 of the wafer 10 (step 206). Accordingly, the thickness B (THt) of the transparent film 101 of the wafer 10 is calculated from the equation THt=X1−X2 (step 208).

The triangulation type laser displacement gauge 14-2 is provided on the rear surface side of the wafer 10. After the above processing is finished, the semiconductor laser 141 first irradiates the laser beam, which is focused on the rear surface 104 of the wafer (step 210). The focused laser beam spot image is reflected from the rear surface 104 and converged through a focusing lens 142 on the PSD 143-2. The rear surface 104 of wafer 10 is finished smooth by grinding, and has no transparent film and no resist film as does the wafer surface 103. Thus the reflected light from the wafer rear side 104 is a single light ray and never separated into two light rays, so that a single image is formed on the PSD 143-2. The PSD 143-2 detects the position X3 of the wafer rear surface 104 from the position of the beam that has been reflected from the wafer rear side and converted at a single point (step 212).

The triangulation type laser displacement gauge 14-2 thus measures the position of the wafer rear side 104 and supplies the position data to the computer 4. The computer obtains the thickness A+B (THw) of wafer 10 based on the position data X1, X3 of the front and rear surfaces 102, 104 of the wafer 10 (step 214).

When the thickness measurement at one point is finished, the measurement at the next point is performed in the same way (step 216). Then, the measurement at all points is completed. In other words, after the thickness measurement at one point on the wafer 10 is finished, the robot 3 positions the wafer 10 so that the measuring unit 1 comes at the next measurement point on the wafer 10. Then, the thickness of the wafer at the second point is measured in the same way as at the first point. Similarly, the thickness measurement is made up to the fifth point, or the wafer thickness is measured at a total of five points. When the measurement of the wafer thickness for all measurement points is finished, the robot 3 carries the wafer 10 back to the cassette unit, and keeps it therein.

Incidentally, when the wafers 10 are positioned relative to the measuring unit 1 so that the measuring unit can measure the thickness of wafers 10 at the measurement position, the wafers 10 are not always positioned at the same measurement position. In other words, after a certain wafer 10 is positioned and measured for all measurement points relative to the measuring portion 1, another wafer 10 is tried to be positioned and measured for all measurement points in the same way. However, at this time, the another wafer it is sometimes positioned nearer to or farther from the television camera 13 than the previous measurement position. In order to avoid the measurement error due to this positioning error, this embodiment takes the following processes, for example.

If the wafer 10 is positioned nearer to the television camera 13 than the previous position relative to the measurement position of the measuring unit 1, the distance from the television camera 13 to the wafer surface 101 becomes shorter, and the distance from the laser displacement gauge 14 to the wafer rear side 104 is contrarily longer. Thus, the computer 4 adds the data of the position of wafer surface 102 and the data of the position of wafer rear side 104, thereby removing the effect of the positional deviation caused when the wafer 10 is positioned higher or lower relative to the measurement position. The absolute value of the wafer thickness can be calculated from the distance between the television camera 13 and the laser displacement gauge 14-2 and the sum of the data of the positions of the front and rear sides of the wafer as is estimated by the computer 4. However, since it is difficult to correctly measure the distance between the television camera 13 and the laser displacement gauge 14-2, this embodiment uses a block gauge of which the thickness is known or a wafer of which the thickness is known and the front and rear surface positions of which are previously measured, and measures the wafer thickness by a comparative measurement approach based on this known gauge or wafer. This method will be described below.

It is assumed that a known wafer used as a reference wafer has a thickness of, for example, 400 $\mu$m. and that data of the front and rear surface 102, 104 positions of this wafer are measured to be 25 $\mu$m, and −10 $\mu$m, respectively. When the thickness data, 400 $\mu$m of the reference wafer is supplied to the computer 4, the computer 4 adds the above front and rear surface position data, or 25 $\mu$m+(−10 $\mu$m)=15 $\mu$m, and keeps a reference constant of 400 $\mu$m−15 $\mu$m=385 $\mu$m. It is here assumed that when another wafer of which the thickness is unknown is positioned and measured, the front and rear surface 102, 104 position data are 10 $\mu$m and −20 $\mu$m, respectively. The computer 4 adds the sum of the front and rear surface position data, −20 $\mu$m+10 $\mu$m=−10 $\mu$m to the kept reference constant 385 $\mu$m, or makes addition of 385 $\mu$m+(−10 $\mu$m)=375 $\mu$m, thus determining the wafer thickness.

FIG. 10 is a flowchart to which reference is made in explaining the operation of this embodiment for measuring the wafer thickness by this comparative measurement method.

Figure 11A:
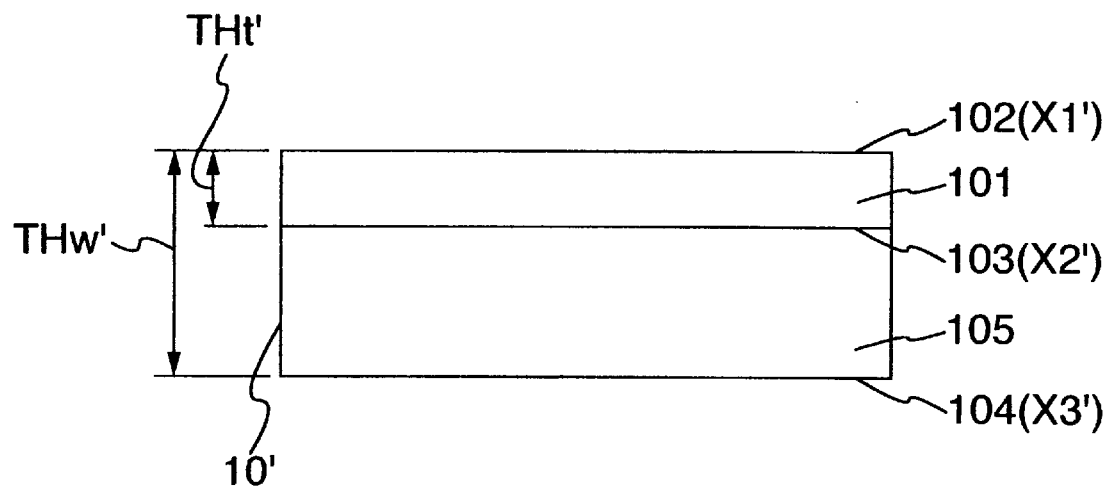
FIGS. 11A and 11B are diagrams of objects being measured to which reference is made in explaining the processing in FIG. 10.
Figure 11B:
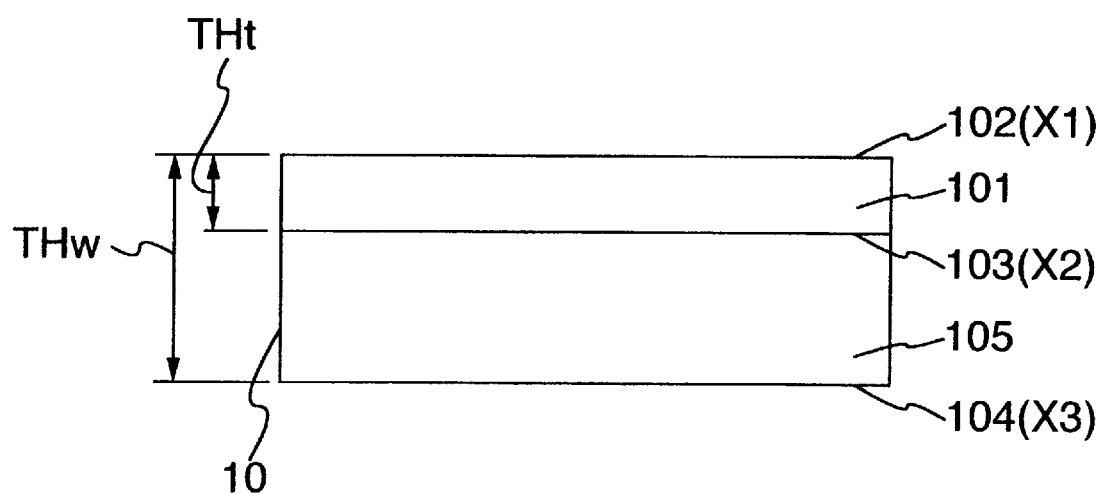

First, the reference wafer thickness is calculated (step 300). That is, as shown in FIG. 11A, when the thickness of a reference wafer 10' is represented by THw', the thickness of the transparent film by THt', and the position data of the wafer surface (major surface of the transparent film) 102, the bottom surface 103 thereof and the rear surface of the wafer by X1', X2', X3', respectively, the reference constant Cw of the reference wafer is obtained as THw'−(X1'+X3'), and the reference constant Ct of the transparent film of the reference wafer as THt'−(X1'+X2').

The wafer 10 is positioned at the measurement point relative to the measuring unit 1 in the same manner as the step 200 (step 302).

Then, in the same way as step 202, the light from the light source 121 is irradiated through the slit 122 on the surface 102 of the transparent film 101 of wafer 10 (step 304).

In the same way as the step 204, the video or image signal from the television camera 13 is supplied through the A/D converter 15 to the memory 16. The computer 4 reads the video signal from the memory 16, and integrates the signal to produce light amount data blocks 41, 42 of slit images 134, 135 (step 306).

In the same way as the step 206, the computer 4 calculates the barycentric positions X1, X2 of the two light amount data blocks 41, 42 (step 308).

Then, the computer calculates the thickness THt of the transparent film 101 of wafer 10, or THt=Cl+(X1+X2) (step 310).

In the same way as the step 210, the semiconductor laser 141 of the laser displacement gauge 14-2 irradiates a laser beam on the rear surface 104 of the wafer (step 312).

Then, in the same way as the step 212, the computer 4 reads image data from the triangulation type laser displacement gauge 14-2, and determines the position data X3 of the rear surface 104 of the wafer (step 314).

Also, the computer 4 calculates the thickness THw of the wafer 10 from the equation THw=Cw+(X1+X3) and the position data X1, X3 of the front and rear surface 102, 104 of the wafer (step 316).

After the thickness measurement at one measurement point is finished, the thickness measurement at the next measurement point is similarly made (step 318), and finally the measurement at all points is finished.

The present invention is naturally able to measure only the thickness THt of the transparent film of the wafer as described above. In other words, slit light is obliquely irradiated on the transparent film 101, so that two reflected slit light rays are produced from the front surface 102 and the bottom surface 103 of the transparent film of the wafer. These light rays are picked up by the television camera 13, and converted into digital image data by the A/D converter 15. The image data is integrated in the longitudinal direction of each of the two reflected slit light rays. The positions of the front and bottom surfaces 102, 103 of the wafer are found by calculating the barycentric positions of the integrated image data in the width direction of slit light, and the thickness of the transparent film is estimated from the positions.

In addition, it is possible to measure only the thickness (the total thickness of the transparent film and non-transparent film) THw of the whole wafer. In that case, as illustrated in the flowcharts of FIGS. 9 and 10, only the position data X1 is determined at steps 204, 206 or steps 306, 308, but the step 208 or 310 is omitted, or not executed.

While the above embodiment employs the triangulation type laser displacement gauge 14-2 as the means for measuring the position of the surface 104 of the non-transparent film 105, other known position measuring apparatus such as the electrostatic capacitance type displacement sensor may be used in place of the triangulation type laser displacement gauge.

While the embodiment of the invention has been described about the measurement of a semiconductor wafer, this embodiment is of course effective to measure other objects than the semiconductor as in the determination of the thickness of a thin plate having a transparent film. Also, while a television camera is used as an image pick-up device in the above embodiment, the television camera may be a line sensor, and in this case it can determine the positions of the front and rear sides of the transparent film without the integrating process. That is, the television camera 13 in FIG. 4 can be replaced by line sensor, and the step 204, 306 in the flowchart of FIG. 9 or 10 is removed.

Moreover, the image pick-up device may be other devices having the same function as that of the television camera.

Thus, according to the invention mentioned above, the wafer thickness even having a transparent film can be correctly measured without damaging the wafer. In addition, since the measuring unit of the invention has no contact to the wafer and no measuring contact probe that is moved up and down as in the prior art, it can fast measure. Furthermore, since the apparatus of the invention uses a single robot to carry a wafer and position it relative to the measuring unit, it is simple in construction, and can carry and position the wafer in a short time. Therefore, the thickness measuring apparatus of the invention has a small size and high reliability, and can measure the thickness of a semiconductor wafer with low cost and with high speed and high precision.

What is claimed is:

1. A thickness measuring apparatus comprising:
   a light source for emitting obliquely a slit-like light ray on a major surface of a light-transmittable layer of an object which comprises said light-transmittable layer and a non-light-transmittable layer;
   an image pick-up device for receiving a first reflection slit-like light ray reflected from said major surface of said light-transmittable layer of said object and a second reflection slit-like light ray reflected from a surface of said non-light-transmittable layer and outputting first and second video signals relating to said first and second reflection slit-like light rays, respectively;
   an analog-to-digital converter for converting said first and second video signals into first and second digital image data;
   a position detecting section for integrating said first and second digital image data along a longitudinal direction of said first and second reflection slit-like light rays, and calculating first and second barycentric positions of said integrated first and second digital image data in a width direction of said first and second reflection slit-like light rays, respectively, said calculated first and second barycentric positions corresponding to positions of said major surface of said light-transmittable layer and said surface of said non-light-transmittable layer of said object, respectively; and
   a first thickness calculating section for calculating a thickness of said light-transmittable layer of said object on a basis of said position of said major surface of said light-transmittable layer and said position of said surface of said non-light-transmittable layer.

2. A thickness measuring apparatus according to claim 1, further comprising:
   a position measuring section for measuring a position of a rear surface of said non-light-transmittable layer opposite to said major surface thereof; and
   a second thickness calculating section for calculating a thickness of said object on a basis of said position of said major surface of said light-transmittable layer and said position of the rear surface of said non-light-transmittable layer.

3. A thickness measuring apparatus comprising:
   a first position measuring section for measuring a position of a first surface of an object;
   a second position measuring section for measuring a position of a second surface of said object opposite to said first surface; and
   a thickness calculating section for calculating a thickness of said object on a basis of said positions of said first surface said second surface of said object, wherein said thickness calculating section comprises:
      a light source for emitting obliquely a slit-like light ray on said second surface of said object;
      an image pick-up device for receiving a reflection slit-like light ray reflected from said second surface of said object and outputting a video signal therefrom;
      an analog-to-digital converter for converting said video signal into digital image data; and
      a position detecting section for integrating said digital image data along a longitudinal direction of said reflection slit-like light ray, and calculating a barycentric position of said integrated digital image data in a width direction of said reflection slit-like light ray, said calculated barycentric position corresponding to a position of said second surface of said object.

4. A thickness measuring apparatus according to claim 3, wherein said object comprises a non-light-transmittable layer and a light-transmittable layer provided on a surface of said non-light-transmittable layer.

5. A thickness measuring apparatus according to claim 3, wherein said first position measuring portion is a triangulation type laser displacement gauge or an electrostatic capacitance type displacement sensor.

6. A thickness measuring apparatus according to claim 3, wherein said objet is a semiconductor wafer comprising a non-light-transmittable layer and a light-transmittable layer provided on a major surface of said non-light-transmittable layer.

7. A thickness measuring apparatus comprising:
   a first position measuring section for measuring a position of a first surface of an object;
   a second position measuring section for measuring a position of a second surface of said object opposite to said first surface; and
   a thickness calculating section for calculating a thickness of said object on a basis of said positions of said first and second surfaces of said object, wherein said thickness calculating section comprises:
      a light source for emitting obliquely a slit-like light ray from said slit on said second surface of said object;
      a line sensor having an image pick-up surface for receiving a reflection slit-like light ray reflected from said second surface of said object and converting said reflection slit-like light ray into a video signal;
      an analog-to-digital converter for converting said video signal into digital image data; and
      a position detecting section for detecting a position of said second surface of said object on a basis of said digital image data.

8. A thickness measuring apparatus according to claim 7, wherein said object comprises a non-light-transmittable layer and a light-transmittable layer provided on a major surface of said non-light-transmittable layer, wherein a major surface of said light-transmittable layer opposed to said major surface of said non-light-transmittable layer is said second surface.

9. A thickness measuring apparatus according to claim 7, wherein said first position measuring portion is a triangulation type laser displacement gauge or an electrostatic capacitance type displacement sensor.

10. A thickness measuring apparatus comprising:
    a housing for storing an object being measured;
    a positioning section for taking said object out of said housing, carrying said object and positioning said object at a measuring point;
    a first position measuring section for measuring a position of a first surface of said positioned object;
    a second position measuring section for measuring a position of a second surface of said positioned object opposite to said first surface; and a thickness calculating section for calculating the thickness of said object on a basis of the position of said first surface measured by said first position measuring section and the position of said second surface measured by said second position measuring section, wherein said thickness calculating section comprises:

a light source for emitting obliquely a slit-like light ray on said second surface of said object;

an image pick-up section for receiving a reflection slit-like light ray reflected from said second surface of said object and converting said reflection slit-like light ray into a video signal;

an analog-to-digital converter for converting said video signal into digital image data; and a position detecting section for detecting a position of said second surface of said object on a basis of said digital image data.

11. A thickness measuring apparatus according to claim 10, wherein said image pick-up portion is a line sensor.

12. A thickness measuring apparatus according to claim 10, wherein said position detecting section calculates a position of said reflection slit-like light ray thereby to obtain said position of said second surface of said object.

13. A thickness measuring apparatus according to claim 10, wherein said object comprises a non-light-transmittable layer and a light-transmittable layer provided on a surface of said non-light-transmittable layer.

14. A thickness measuring apparatus according to claim 10, wherein said first position measuring portion is a triangulation type laser displacement gauge or an electrostatic capacitance type displacement sensor.

15. A thickness measuring apparatus according to claim 13, wherein said image pick-up device receives a first reflection slit-like light ray reflected from the major surface of said light-transmittable layer of said object and a second reflection slit-like light ray reflected from a major surface of said non-light-transmittable layer and outputs first and second video signals relating to said first and second reflection slit-like light rays, respectively;

said analog-to-digital converter converts said first and second video signals into first and second digital image data, respectively;

said position detecting section integrates said first and second digital image data from said analog-to-digital converter along a longitudinal direction of said first and second reflection slit-like light rays, and calculates first and second barycentric positions of said integrated first and second digital image data in a width direction of said first and second reflection slit-like light rays, respectively, said calculated first and second barycentric positions corresponding to positions of said major surface of said light-transmittable layer and said surface of said non-light-transmittable layer of said object, respectively; and said thickness measuring apparatus further includes another thickness calculating section for calculating a thickness of said light-transmittable layer of said object on a basis of said position of said major surface of said light-transmittable layer and said position of said major surface of said non-light-transmittable layer.

\* \* \* \* \*